Jan. 10, 1967   R. WARNER   3,297,332

SKIS

Filed Jan. 15, 1964

INVENTOR.
ROBERT WARNER
BY William L. Fisher
HIS ATTORNEY

United States Patent Office 3,297,332
Patented Jan. 10, 1967

3,297,332
SKIS
Robert Warner, Warren, Mich., assignor to Jet Stream Industries, Mt. Clemens, Mich., a corporation of Michigan
Filed Jan. 15, 1964, Ser. No. 337,916
10 Claims. (Cl. 280—11.13)

This invention relates to improvements in skis.

Its object is to provide an improved ski with a glass fibered resinous body and metal runners at the lower outer edges.

Such object and the advantages of the invention will appear from the following description taken in conjunction with the accompanying drawings in which.

Figure 3:
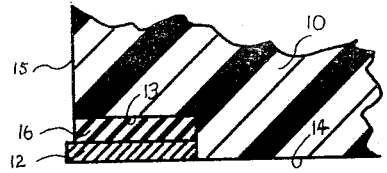
FIG. 3 is an enlarged fragmentary sectional view of a part of the structure of FIG. 2.

Referring to the drawings in greater detail, 10 designates the body of the ski which is made up of layers of glass fiber embedded in a compatible and hardenable synthetic resin. As an example, such glass fibered resinous body may be formed by impregnating rovings, mats or woven cloth of glass fibers with resin such as a polymerizable polyester resin prepared by the reaction of a dihydric alcohol and a dibasic acid. The resin-impregnated glass fiber mixture may then be placed in a mold under heat and pressure and there maintained until the resin is completely polymerized or hardened. The formation of such glass fibered resinous bodies is well known in the glass fiber-resin art and forms no part of the present invention.

Figure 2:
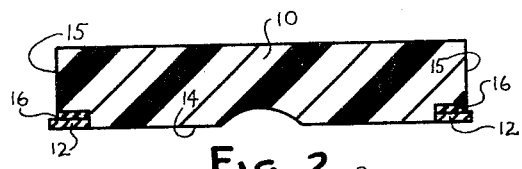
FIG. 2 is a transverse sectional view of the structure of FIG. 1 taken substantially along the line 2—2 thereof.
Figure 1:
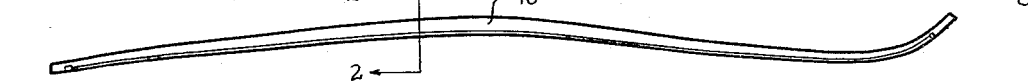
FIG. 1 is a side elevational view of an improved ski embodying the invention.
Figure 4:
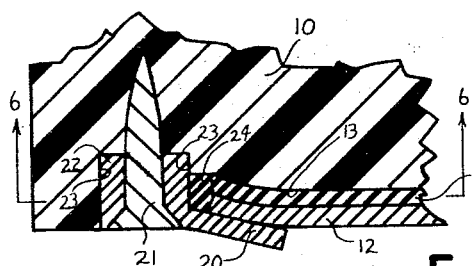
FIGS. 4 and 5 are fragmentary sectional views of the assembly of the parts of the structure of FIG. 1.
Figure 5:
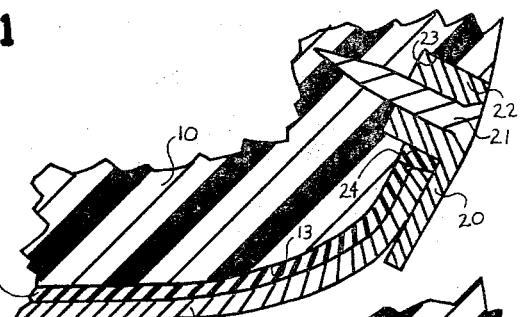
Figure 6:
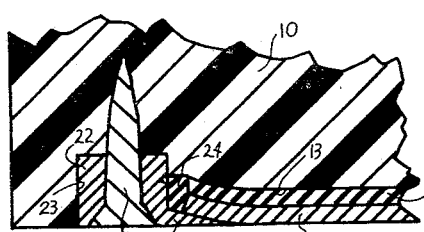
FIG. 6 is a horizontal sectional view of a part of the structure of FIG. 4 taken substantially along the line 6—6 thereof.
Figure 6:
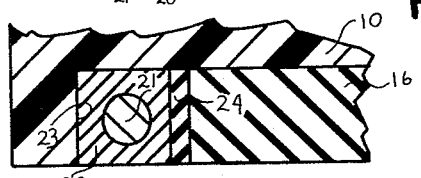

In accordance with the present invention metal runners 12 constitute a part of the running surface of the ski and are provided at the lower outer edges of the body 10, which runners extend longitudinally thereof as shown in FIGS. 1, 4 and 5. Recesses 13 are integrally formed in the body 10 at said edges to accommodate the runners 12. Means bonded to the body over the length thereof retain the runners in the recesses so that they are flush with the bottom surface 14 of the body and project laterally at least to the side walls thereof, as at 15, and preferably slightly beyond as shown in FIGS. 2 and 3.

In the embodiment of the invention shown in FIGS. 1–6 such retaining means bonded to the body 10 comprise elastomeric members 16 such as hard rubber which extend longitudinally of the body within the recesses 13 inside of the runners 12. The members 16 are bonded by one face to the body 10 and by the opposite face to the runners 12 over the lengths thereof. I have found that the body 10 and the metal runners 12 bond to the members 16 far better than to each other and that the members 16 take up the differential forces on the body 10 and the runners 12 from tension, compression and flexion and thermal expansion and contraction.

Figure 8:
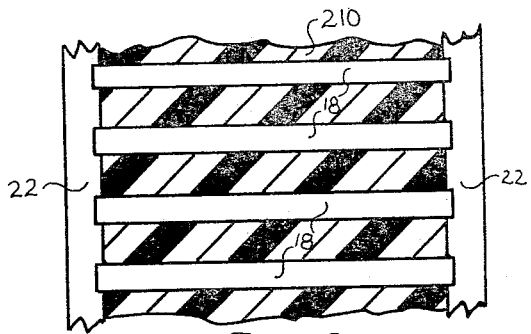
FIG. 8 is a longitudinal sectional view of the structure of FIG. 7 taken substantially along the line 8—8 thereof.
Figure 7:
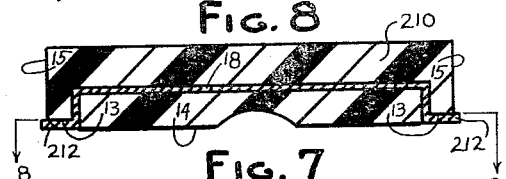
FIG. 7 is a view similar to FIG. 2 of a modified ski embodying the invention.

In the embodiment of the invention shown in FIGS. 7 and 8 the retaining means bonded to the body, designated 210, comprise transverse metal connectors 18 embedded in the body and integral with the runners designated 212.

At the ends of each of the runners 12 and 212 an anti-stubbing mechanism is provided which is fastened to the body 10 beyond the length of the recesses 13 and overlays each runner end. Such mechanism comprises a metal plate 20 of the same width as the runner which it overlays and which is fastened, as by screw 21, to the body 10 and which, after being so fastened is made flush, as by grinding, with the bottom surface of the respective runner as shown in FIG. 5. A metal insert 22 of square cross-section (FIG. 6) is integrally formed with the plate 20 and is bonded within a correspondingly shaped socket 23 formed in the body 10 at the end of the recess 13. Disposed within the recess 13 at the ends of the runners and held against an end wall, as a side of the insert 22, by the plate 20 is another elastomeric member 24 which absorbs forces tending to expand the respective runner.

It will thus be seen that there has been provided by the present invention improvements in skis in which the object hereinabove set forth together with many other thoroughly practical advantages have been successfully achieved. While preferred embodiments of the invention have been shown and described it is to be understood that modifications, variations and changes may be resorted to without departing from the ambit of the invention as defined by the appended claims.

What is claimed is:

1. In a ski, the combination of a glass fibered resinous body, metal runners at the lower outer edges of the said body extending longitudinally thereof, said body having integrally molded recesses at said edges accommodating said runners, means bonded to said body over the length thereof and retaining said runners in said recesses so that they are flush with the bottom surface of said body and project laterally at least to the side walls thereof, and antistubbing members fixedly secured to said body in said recesses to overlie each end of each runner in a zone in longitudinal alignment with the latter.

2. A ski according to claim 1 in which the retaining means bonded to said body comprise spaced transverse metal connectors embedded in said body and integral with said runners.

3. A ski according to claim 1 in which the retaining means bonded to said body comprises elastomeric members extending longitudinally thereof and disposed in said recesses inside of said runners, said members being bonded at one face to said body and at the opposite face to said runners.

4. The ski of claim 1, in which an elastomeric member extending longitudinally of said body is disposed in each of said recesses inside of the respective runners, said elastomeric members being bonded at one face to said body and at the opposite face to the respective runners, said antistubbing members compressing the respective elastomeric members at at least one end of the latter by force applied to the respective adjacent runner ends.

5. The ski of claim 4, in which other elastomeric members are disposed within said recesses at said runner ends to permit the runners to expand, said other members being held in the recesses and against an end of the respective runners by the respective antistubbing mechanisms.

6. The ski of claim 1, in which said antistubbing members, as disposed in said recesses, have ground surfaces flush with the bottom surface of the runners in the recesses.

7. In a ski, the combination of a glass fibered resinous body, a metal runner at the lower outer edge of said body extending longitudinally thereof, said body having a recess at said edge accommodating said runner, an anti-stubbing mechanism at an end of the runner which is fastened to said body beyond the length of the recess and overlies said runner end and prevents stubbing thereof, and an elastomeric member extending longitudinally of said body and disposed in said recess inside of the runner, said member being bonded at one face to said body and at the opposite face to said runner, said antistubbing mechanism compressing said member by force applied to said runner end.

8. The ski of claim 7, in which another elastomeric member is disposed within said recess at said runner end to permit the runner to expand, said other member being held in the recess and against the runner end by the antistubbing mechanism.

9. In a ski, the combination of a glass fibered resinous body, metal runners at the lower outer edges of the said body extending longitudinally thereof, said body having integrally molded recesses at said edges accommodating said runners, means bonded to said body over the length thereof and retaining said runners in said recesses so that they are flush with the bottom surface of said body, and an antistubbing member disposed in each of said recesses and secured to said body at at least one end of each runner, said members overlying said ends in a zone in longitudinal alignment with the respective runners.

10. The ski of claim 9, in which said anti-stubbing members, as disposed in said recesses, have ground portions flush with the respective runner ends.

References Cited by the Examiner

UNITED STATES PATENTS

| | | | |
|---|---|---|---|
| 1,973,343 | 9/1934 | Hansen | 280—11.13 |
| 2,264,535 | 12/1941 | Klemm | 280—11.13 |
| 2,694,580 | 11/1954 | Head | 280—11.13 |
| 2,695,178 | 11/1954 | Rheinfrank | 280—11.13 |
| 3,132,874 | 5/1964 | Badou | 280—11.13 |
| 3,134,604 | 5/1964 | Aublinger | 280—11.13 |

FOREIGN PATENTS

| | | |
|---|---|---|
| 220,044 | 3/1962 | Austria. |
| 572,337 | 3/1959 | Canada. |
| 180,437 | 1/1936 | Switzerland. |
| 251,419 | 8/1948 | Switzerland. |

BENJAMIN HERSH, *Primary Examiner.*

MILTON L. SMITH, *Examiner.*